Aug. 23, 1966   R. S. JONES ET AL   3,268,021
FLEXIBLE DOUBLE WALLED SKIRT FOR GROUND EFFECT VEHICLES
Filed Jan. 11, 1963   5 Sheets-Sheet 1

INVENTORS
RICHARD S. JONES
ALEXANDER W. PRICKETT

BY *Larson and Taylor*

ATTORNEYS

Aug. 23, 1966   R. S. JONES ETAL   3,268,021
FLEXIBLE DOUBLE WALLED SKIRT FOR GROUND EFFECT VEHICLES
Filed Jan. 11, 1963   5 Sheets-Sheet 2

INVENTORS
RICHARD S. JONES
ALEXANDER W. PRICKETT

BY *Larson and Taylor*

ATTORNEYS

Aug. 23, 1966      R. S. JONES ETAL      3,268,021
FLEXIBLE DOUBLE WALLED SKIRT FOR GROUND EFFECT VEHICLES
Filed Jan. 11, 1963      5 Sheets-Sheet 3

INVENTORS
RICHARD S. JONES
ALEXANDER W. PRICKETT

BY *Larson and Taylor*

ATTORNEYS

INVENTORS
RICHARD S. JONES
ALEXANDER W. PRICKETT

BY *Larsen and Taylor*

ATTORNEYS

United States Patent Office 3,268,021
Patented August 23, 1966

3,268,021
FLEXIBLE DOUBLE WALLED SKIRT FOR
GROUND EFFECT VEHICLES
Richard Stanton Jones, Cowes, Isle of Wight, and Alexander Walpole Prickett, East Cowes, Isle of Wight, England, assignors to Westland Aircraft Limited, Yeovil, England
Filed Jan. 11, 1963, Ser. No. 250,881
Claims priority, application Great Britain, Jan. 22, 1962, 2,178/62; Apr. 6, 1962, 13,254/62
14 Claims. (Cl. 180—7)

This invention relates to amphibious ground effect vehicles and more particularly to ground effect vehicles which have their lift jets or stabilising jets flexibly extended below the rigid base structure of the vehicle in order to improve their efficiency and operating heights.

The invention is primarily concerned with ground effect vehicles using peripheral jet systems, but need not be confined to this one concept, as it could be employed in other concepts, such as sidewall vehicles, where any of the lift jets or stabilising jets are flexibly extended.

Flexible extension of the lift jets on vehicles employing peripheral jet systems usually involves flexible "skirting" extending both the inner and outer walls of the rigid jets and the two "skirts" are attached to each other by strengthening and shaping ties or diaphragms placed transversely between the opposed flexible walls within the duct. The complete arrangement forms a trunking which the diaphragms divide into sections rather like the note separators in the mouthpiece of a mouthorgan.

These flexible trunk extensions, from which the cushion forming fluid emerges in the form of air or other gaseous mixture, are designed to deflect momentarily upon impact with wave crests or other objects, in order to avoid damage to the jet system.

However, during the development trials on such a vehicle it was found that when a wave is struck water can be scooped into the jet orifices, and as it strikes the flexible reinforcing diaphragms which lie in the plane opposed to the direction of movement, not only does it apply considerable drag, but sometimes causes the trunking to split open. This effect is particularly undesirable when only one side of the machine is struck, and could be dangerous if occurring at high speed.

Our object in this invention is to provide new methods of constructing the trunking, in order to overcome the disadvantages outlined above.

According to the present invention, the opposed flexible walls forming a flexible jet system of the kind set forth are connected at spaced intervals by cross-members constructed or arranged to avoid presenting a surface which induces the build-up of water within the jet orifices when a wave crest is struck and the orifices are immersed.

The object of the invention can be achieved in several different ways, and several embodiments will now be described, by way of example, with reference to the accompanying drawings, in which.

In all the figures like numerals represent like parts.

Figure 1:
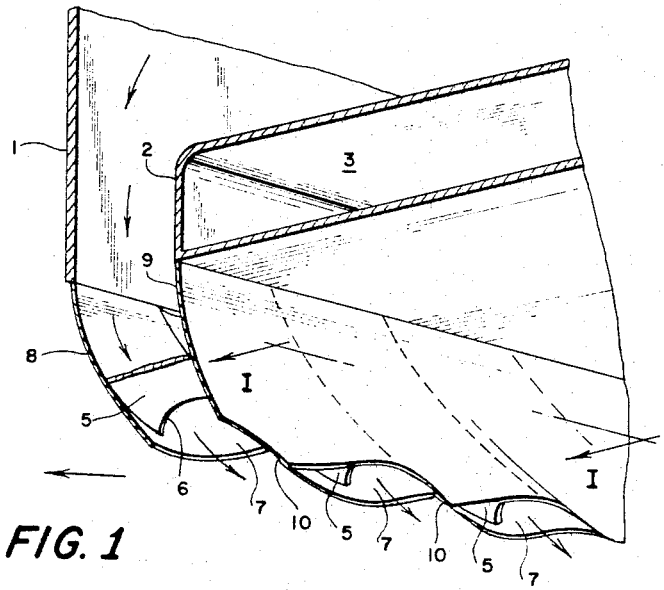
FIGURE 1 is a perspective view of a section of flexible trunking showing one form of the invention.
Figure 2:
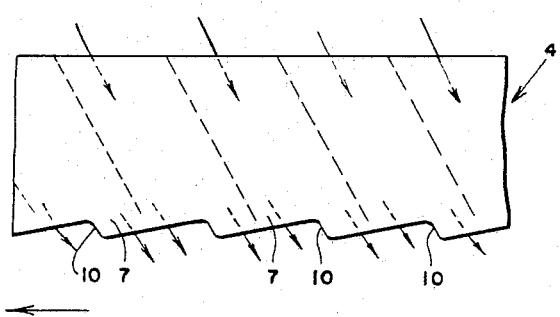
FIGURE 2 shows the trunking in elevation, as viewed on arrows I—I in FIGURE 1.

Referring to FIGURES 1 and 2 of the drawings, the outer wall of the peripheral jet of a ground effect vehicle is depicted by the numeral 1, the inner wall at 2, the buoyancy tank at 3, whilst the flexible trunking is generally indicated at 4. Details of the flexible trunking 4 comprise strengthening ties or diaphragms 5 which have been given a rearward rake and are cut back or scalloped as at 6, in order to keep the mouth of the jet orifices 7 clear, and allow the free passage of water, should the lower edges of the trunking 4 strike a wave crest. The flexible walls 8 and 9 extending from the rigid walls 1 and 2 respectively have also been cut back along their lower edges, in order to form a series of rearwardly angled steps 10. The stepped portions 10 are disposed substantially between the diaphragms 5, and are bolted or riveted together, so that they form a series of ellipse-shaped jet orifices 7 joined end to end, and wherever they are employed in jets along the longitudinal axes of the vehicle, will present a streamlined shape to the wave crest, which cuts through the water and allows it to pass along the sides of the trunking 4 without any scooping action. Metal clips could, if desired, be employed in place of the bolts or rivets at 10, which would also provide a knife edge to the stepped portion 10, besides acting as a reinforcing strip, to prevent wear when striking the ground. The purpose of the rearward rake is to ensure that the leading edge of the step 10 is presented to the water in all normal attitudes of "flights," besides giving the jet efflux a preferred bias rearwards.

Figure 3:
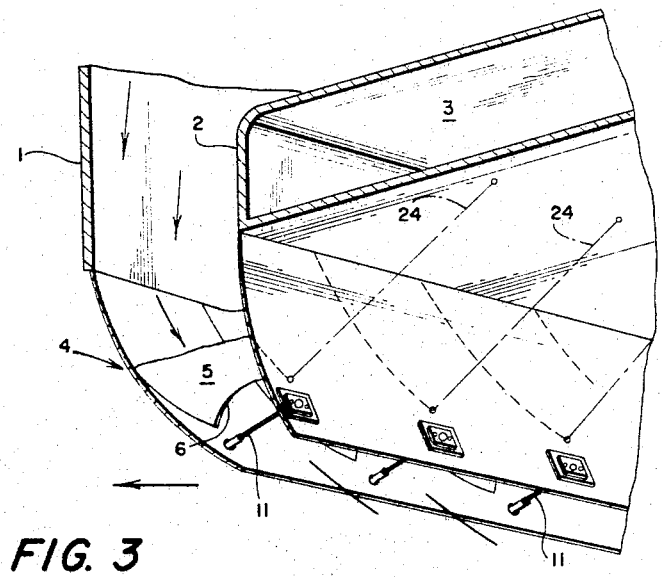
FIGURE 3 is a perspective view of a section of flexible trunking showing another form of the invention.
Figure 4:
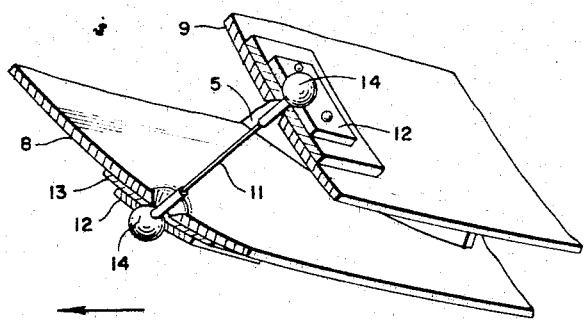
FIGURE 4 shows an enlarged detail of the embodiment shown in FIGURE 3.

In an alternative construction the walls 8 and 9 may be connected at evenly spaced intervals by lengths of wire or cable 11 as shown in FIGURES 3 and 4. The ends of the wire or cable 11 pass through holes in the walls 8 and 9 and the outer plates 12, made of metal or other hard material, and their free ends, are provided with beads 14, which are of larger diameter than the holes in the plates, so that the opposed flexible walls can flex towards each other, but are restrained from moving apart by more than the length of wire 11 allows. Reinforcing strips 13 cemented to the flexible walls 8 and 9 under the plate 12 would provide a strong construction and countersunk holes in the outside of the reinforcing plate would provide a location for the beads 14. In this construction also, if a wave is struck, the water can pass freely over and around the cables or wires 11, and pass beneath the cut away portions 6 in the diaphragms 5, so that no scooping action or large drag build up occurs.

Figure 5:
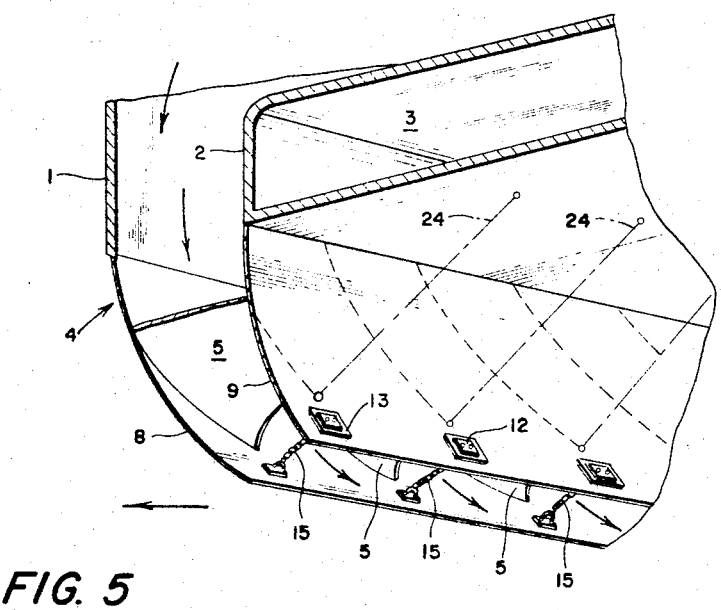
FIGURE 5 is a perspective view of a section of flexible trunking showing another embodiment of the invention.
Figure 6:
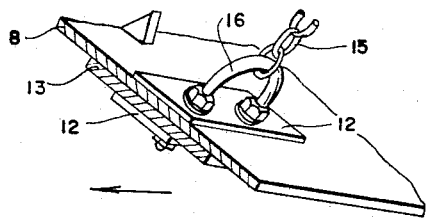
FIGURE 6 is an enlarged detail of the embodiment shown in FIGURE 5.

In another and preferred embodiment of the invention, the cross-members connecting the opposed lower edges of trunking are of articulated construction, preferably chains, as shown at 15 in FIGURES 5 and 6. In this construction, the chains 15 replace the wires 11 in FIGURES 3 and 4, being attached to the walls 8 and 9 of the trunking 4 by means of U bolts 16 mounted on metal plates 12 over reinforcing strips 13 cemented to the flexible material of the walls 8 and 9. The diaphragms 5 are cut back at 6, as in previous embodiments, in order to allow free passage for the water which can flow through the gap at 6 and over the chains with little resistance. When taut, the chains restrain the jet orifices 7 from enlarging beyond the desirable amount, but allow free relative movement between the opposed flexible walls 8 and 9 in any direction when slack, i.e. upon wave or obstacle impact or ground contact. Such a construction provides a marked increase in the fatigue life of the flexible jet systems, additionally, it provides less risk of local impact damage than other constructions, by allowing greater flexibility of relative movement between the skirts where it is most needed. For additional strengthening of the diaphragms 5, wire or chains may be provided within the flexible trunking 4 as required. Preferably these additional wires or chains are disposed substantially up the lines made between the diaphragms 5 and the flexible walls 8 and 9.

The wires 11 or chains 15 are arranged and positioned such that the line of force acting along each wire or chain is transferred through backstrops 24 (shown chain dotted in FIGURES 3 and 5) to the base of the buoyancy tank 3 of the vehicle, one backstrop being provided for each diaphragm wire or diaphragm chain assembly. The lines of force projected from one such assembly are adapted to terminate at the same point at the base of the buoyancy tank 3 and a plurality of such points projected from each assembly around the periphery of the vehicle will form a geometrical shape, such as an ellipse, which corresponds generally to the shape of the platform of the vehicle.

This development is advantageously used in the construction of flexible jet systems for highspeed machines, that is to say, those capable of speeds in the order of 70 knots or more. It will be appreciated that at such speeds, the impact pressures exerted upon the flexible jets are very considerable.

Figure 7:
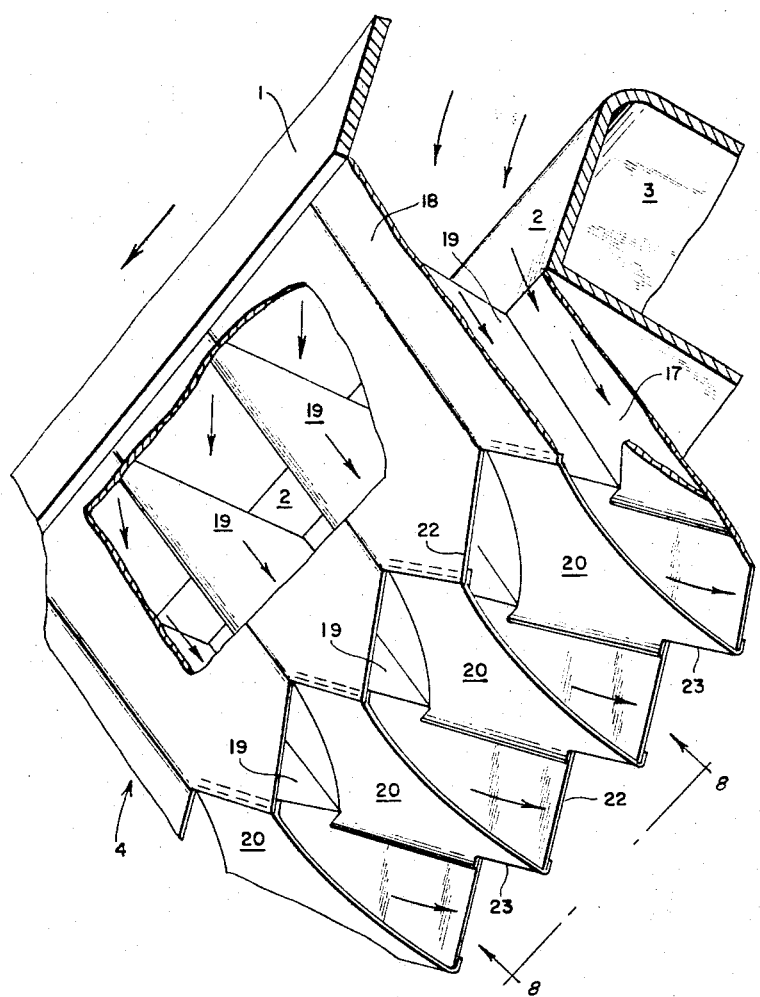
FIGURE 7 is a perspective view of yet another embodiment of the invention.
Figure 8:
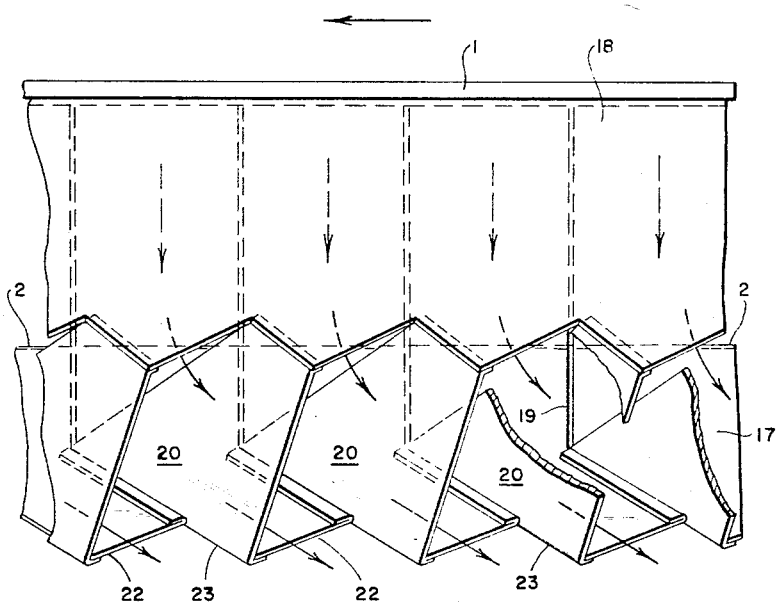
FIGURE 8 is a view from beneath substantially on arrows VIII—VIII of FIGURE 7.

In yet a further embodiment of the invention, as illustrated in FIGURES 7 and 8, the inner and outer walls 17 and 18 respectively of the flexible trunking, generally indicated at 4, have two sets of diaphragms 19 and 20 joining the inner and outer walls transversely, and these are so arranged that water scooping is prevented. This is achieved by cutting back the vertically disposed diaphragms 19, in order to prevent their lower parts from presenting a barrier to any water encountered and placing smaller diaphragms 20 diagonally across the mouths of the square nozzles 21, which are formed between the vertical diaphragms 19. The lower edges of the inner and outer flexible walls 17 and 18 are cut to form a series of rearwardly angled steps 22, as viewed in elevation, and the rise of each step 22 forms a support for the ends of the diagonal diaphragms 20, where they are joined to the inner and outer flexible walls 17 and 18, substantially on the line of the vertical diaphragms 19. The rearward rake thus imparted to the diagonal diaphragms 20 is devised so that the lower edge portions of the diaphragms 20, where they meet the stepped inner wall 17 at an angle, form a sharp leading edge 23 which, because of the angle of the steps 22, is always first to cut a wave crest. In addition, it will be seen that the lower edge of the outer flexible wall 18 is cut into a higher level than the lower edge of the flexible inner wall 17. This design feature ensures that, after the leading edge 23 has ploughed a wave crest, the water is free to pass over the outside or forward face of the diagonal diaphragm 20, most of it being thrown outwards clear of the vehicle, according to the deflection angle of diaphragm 20, in a similar manner to the flared bow of a speedboat. Thus, it will be apparent that little resistance is created by the lower edges of the flexible trunking 4 when a wave is struck, and the scooping action is avoided.

In all the embodiments hereinbefore described, it will be appreciated by all skilled in this art that numerous refinements and modifications are possible without departing from the scope of the invention, and that a large variety of flexible materials are now available, of sufficient strength for the purpose outlined. The arrangements described are intended to be appropriately aligned as necessary in relation to the direction of travel, and therefore general wave impact. It will also be understood that the arrangements described may be used to advantage in the peripheral lift jets of the vehicle, but could be suitably altered and aligned to find application in obliquely disposed stability keels placed athwartships within the cushion area embraced by the peripheral jets.

We claim as our invention:

1. An amphibious ground effect vehicle comprising flexible walls forming downwardly directed jets, the opposed flexible walls forming a flexible jet system being connected at spaced intervals by cross-members disposed to avoid presenting a surface which induces the build up of water within the jet orifices, said cross-members being substantially vertically disposed flexible diaphragms in combination with diagonally disposed flexible diaphragms attached to and placed between said flexible walls, the lower edges of said flexible walls being cut to form stepped portions substantially on the line of said vertical diaphragms, said diagonal diaphragms being placed across the outlets of the square orifices formed by said vertical diaphragms and said walls, and attached at their ends to the stepped portions on either wall, so that the angle formed by said diagonal diaphragms and said inner wall forms a leading edge.

2. An amphibious ground effect vehicle, as claimed in claim 1, wherein said diagonal diaphragms are given a rearward rake, in order to present said leading edge to the water at all times.

3. An amphibious ground effect vehicle, as claimed in claim 2, wherein the outer flexible wall is cut back to a higher lever than the inner flexible wall, in order to provide a "flare out" for water cut by said leading edge.

4. A ground effect vehicle comprising, a base structure, a jet system for generating a pressurized air cushion, said jet system including at least one peripheral jet, said jet including spaced inner and outer walls formed of a flexible flaccid material, said inner and outer walls depending beneath said base to provide jet orifices between the lower peripheral edges thereof, said walls adapted to be deflected upon contact with an obstruction, and means for maintaining said inner and outer walls in spaced relation, said means comprising flexible members interconnecting said inner and outer walls, said cross members being spaced and lying in planes opposed to the direction of movement of the vehicle, the lower edges of the cross members terminating at points spaced above the lower peripheral edges of the inner and outer walls to prevent build-up of water within the jet orifices.

5. A ground effect vehicle according to claim 4, said inner and outer walls being directly connected to each other at the lower edges thereof between said cross members to form a series of jet orifices.

6. A ground effect vehicle according to claim 4, said cross members being flexible diaphragms, the lower edges of said diaphragms being scalloped shaped to provide free passage for water entering the jet orifices.

7. A ground effect vehicle according to claim 4 wherein said cross members comprise flexible diaphragms, said diaphragms being angled rearwardly with respect to the vertical, the lower edges of the inner and outer walls being step shaped between said diaphragms to provide a leading edge for the orifices.

8. A ground effect vehicle according to claim 7, said inner and outer walls being secured together at the steps.

9. A ground effect vehicle comprising, a base structure, a jet system for generating a pressurized air cushion, said jet system including at least one peripheral jet, said jet including spaced inner and outer walls formed of a flexible flaccid material, said inner and outer walls depending beneath said base to provide jet orifices between the lower peripheral edges thereof, said walls adapted to be deflected upon contact with an obstruction, flexible diaphragms interconnecting said inner and outer walls, and and retaining elements interconnecting said inner and outer walls, said retaining elements being in the same plane as said diaphragms but being independent of said diaphragms.

10. A ground effect vehicle according to claim 9 wherein said flexible retaining means comprise cables, said cables passing through openings in said inner and outer walls and having beads on the outer ends thereof, said beads being larger than the openings.

11. A ground effect vehicle according to claim 10 the openings being reinforced by plates having recesses therein to receive the beads.

12. A ground effect vehicle according to claim 10 wherein said flexible retaining means are articulated.

13. A ground effect vehicle according to claim 9 wherein said retaining elements are secured to the inner opposing faces of said inner and outer walls by means of U bolts.

14. A ground effect vehicle according to claim 13 wherein said retaining elements comprise chains.

References Cited by the Examiner

UNITED STATES PATENTS

| | | | |
|---|---|---|---|
| 3,130,804 | 4/1964 | Bertin | 180—7 |
| 3,134,452 | 5/1964 | Latimer-Needham | 180—7 |

FOREIGN PATENTS

| | | |
|---|---|---|
| 234,436 | 2/1961 | Australia. |
| 975 | 9/1914 | Great Britain. |
| 1,238,499 | 7/1960 | France. |
| 1,263,704 | 5/1961 | France. |

BENJAMIN HERSH, *Primary Examiner.*

FERGUS S. MIDDLETON, MILTON BUCHLER, *Examiners.*

M. A. KLEIN, M. S. SALES, *Assistant Examiners.*